UNITED STATES PATENT OFFICE.

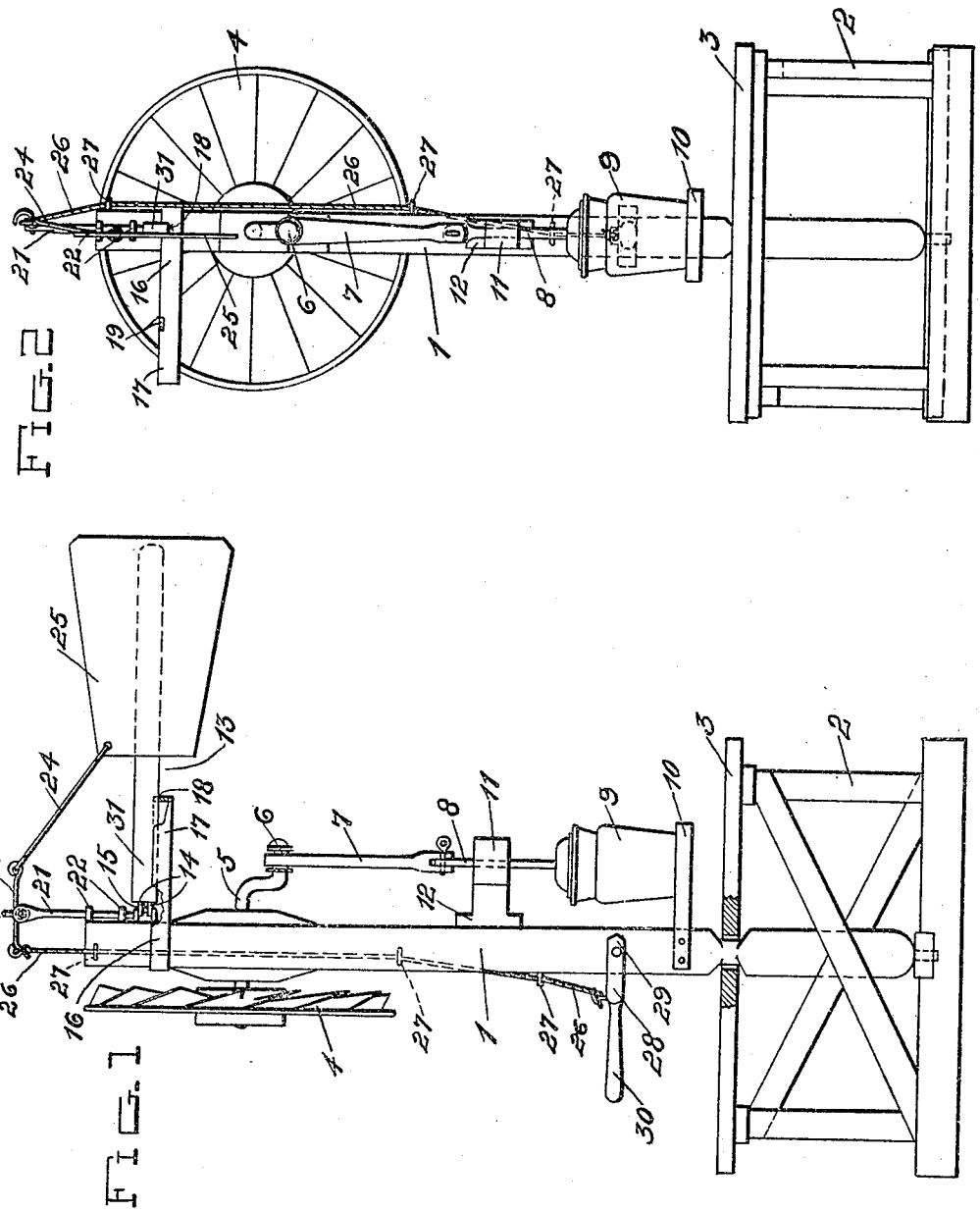

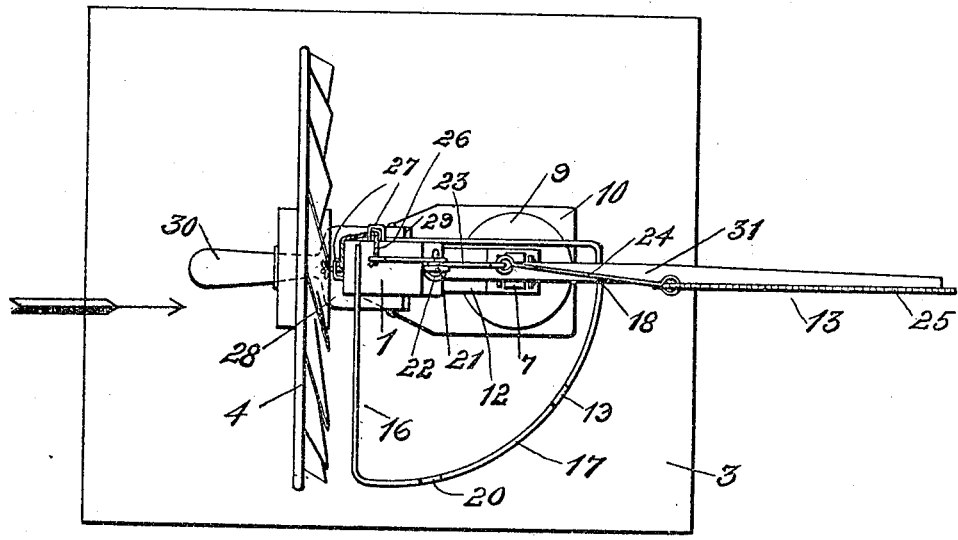
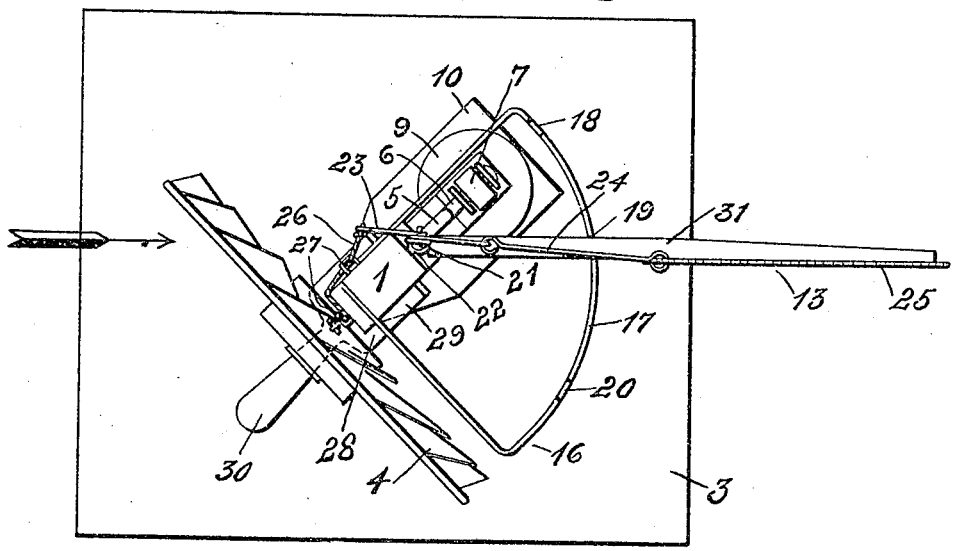

HIRAM W. SMITH, OF WOOLSEY, OKLAHOMA.

WIND-MOTOR.

943,901.　　　　　Specification of Letters Patent.　Patented Dec. 21, 1909.

Application filed June 11, 1909. Serial No. 501,576.

*To all whom it may concern:*

Be it known that I, HIRAM W. SMITH, a citizen of the United States, residing at Woolsey, in the county of Stephens and State of Oklahoma, have invented certain new and useful Improvements in Wind-Motors; and I do declare the following to be a full, clear, and exact description of the invention, such as will enable others skilled in the art to which it appertains to make and use the same.

This invention relates to improvements in wind motors and has for its object to provide a motor of this kind which may be employed for operating churns, turning grindstones, operating sewing machines or like devices.

A further object is to provide a wind motor which is of simple and economical construction, efficient in operation and which may be thrown into or out of gear or caused to run at half speed when the wind is extremely strong.

With the foregoing and other objects in view, the invention consists of certain novel features of construction, combination and arrangement of parts, as will be more fully described and particularly pointed out in the appended claims.

In the accompanying drawings, Figure 1 is an elevation of a wind mill embodying my improvements; Fig. 2 is a view taken at right angles to Fig. 1; Fig. 3 is a plan view; Fig. 4 is a plan of the mill when adjusted to run at half speed, the arrows indicating the direction or course of the wind.

Referring to the drawings for a more particular description of the invention, 1 indicates the tower which is revolubly mounted upon the frame 2 and extends through the platform 3 thereof.

The numeral 4 indicates the wind wheel which may be of any ordinary construction. As shown, the shaft 5 of the wind wheel is provided at one end with a crank 6 with which is connected the pitman 7 which is connected at its lower forked end with the upper end of the plunger 8 of the churn 9 which is mounted upon the horizontal support 10 secured to the tower at a point somewhat above the platform. The upper end of the plunger 8 of the churn works through a guide 11 secured to the outer end of the bracket 12. The weather vane 13 is pivoted to the upper end of the tower 1 by means of the hooks 14 which receive a staple or clip 15. By pivotally mounting the vane in this manner, it is capable of a slight vertical movement as well as a swinging movement. A horizontal locking frame 16 is mounted at the upper end of the tower directly beneath the vane and comprises the curved or arc-shape portion 17 provided at its upper edge and at points equi-distant apart with the notches 18, 19 and 20. A vertical supporting rod 21 is rotatably mounted in the bearings 22 and pivoted to the upper end of said rod is the horizontal operating link 23 which has one end connected by a link 24 with the inner end of the blade 25 of the weather vane and its opposite end connected by means of a cord or other flexible element 26 which passes through the guide staples 27 on the tower with the operating lever 28 comprising a forked inner portion 29 which is pivoted to the tower and the outer handle portion 30.

In practice, when the arm 31 of the weather vane is engaged with the notch 18 of the locking frame or is in a position at right angles with the wind wheel, it will be evident that the latter will receive the full effect of the wind. However, if the wind is too strong and causes the wind wheel to turn too rapidly when in the position indicated in Figs. 1 and 2, the arm of the weather vane is engaged with the intermediate notch 19 so that the wind wheel will be at an angle of approximately 45° with the weather vane and the direction of the wind and will consequently turn at only half speed. When it is desired to throw the wind wheel entirely out of operation, the arm of the weather vane is engaged with the notch 20 of the locking frame. Assuming the weather vane to be engaged with the notch 18 and it is desired to engage it with the notch 19 in order that the wind wheel will only run at half speed, the arm of the vane is raised out of engagement with the notch 18 by pushing down on the operating lever 28 and the tower turned by means of said lever until the notch 19 is brought immediately under the arm of the vane, when the lever is released to permit the arm to engage therewith. In like manner, the arm of the weather vane may be engaged with the notch 20 to throw the wind wheel out of operation.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a device of the class described, a tower, a wind wheel mounted thereon, a horizontal locking frame mounted at the upper end of the tower and comprising an arc-shaped portion formed in its upper edge with a plurality of spaced notches, a weather vane pivoted to the tower above the locking frame and adapted to engage any one of the notches of the latter, and manually operable connections for raising the weather vane out of engagement with the notches of the locking frame and for turning the tower to bring any one of the notches of the locking frame into position to be engaged by the vane whereby the wind wheel may be adjusted at different angles with the vane.

2. In a device of the class described, a supporting frame, a tower rotatably mounted thereon, a wind wheel mounted at the upper end of the tower, a horizontal locking frame secured to the upper end of the tower and comprising a curved portion provided with a plurality of spaced notches, a weather vane pivoted to the upper end of the tower immediately above the locking frame, a supporting rod rotatably mounted at the upper end of the tower, a horizontal operating link pivoted to the upper end of said rod, a link between one end of the operating link and the vane, an operating lever pivoted to the lower end of the tower, and a flexible connection between the other end of the operating link and said operating lever.

3. In a device of the class described, the combination with the tower and wind wheel, of a horizontal locking frame having an arc-shaped portion provided with three notches, which are spaced equi-distances apart, a weather vane pivoted to the upper end of the tower immediately above the locking frame and adapted to engage any one of the notches of the latter, and manually operable connections for raising the vane out of engagement with any one of said notches and for turning the tower to bring any one of the notches of the locking frame in position to be engaged by the vane, whereby the wind wheel may be adjusted at an angle of 45° or at right angles to the vane to cause it to run at half speed or to throw it out of gear, said connections comprising a vertical supporting rod rotatably mounted at the upper end of the tower, an operating link pivoted to the upper end of said rod, a second link between one end of the pivoted link and the vane, an operating lever pivoted to the lower end of the tower, and a flexible connection between the other end of the operating link and said lever.

In testimony whereof I have hereunto set my hand in presence of two subscribing witnesses.

HIRAM W. SMITH.

Witnesses:
C. S. WADE,
N. B. WOOLSEY.